(12) United States Patent
Zhang et al.

(10) Patent No.: US 11,101,741 B2
(45) Date of Patent: Aug. 24, 2021

(54) PARALLEL CONTROL METHOD AND SYSTEM FOR SINGLE-PHASE INVERTERS AND INVERTER

(71) Applicant: CRRC QINGDAO SIFANG ROLLING STOCK RESEARCH INSTITUTE CO., LTD., Qingdao (CN)

(72) Inventors: Bo Zhang, Qingdao (CN); Qingwen Sun, Qingdao (CN); Junbo Zhao, Qingdao (CN); Yunlong Liu, Qingdao (CN); Xuebin Xing, Qingdao (CN); Congcong Wang, Qingdao (CN); Yufei Chen, Qingdao (CN); Meiyun Li, Qingdao (CN); Wendong Ji, Qingdao (CN); Zhenzong Zhu, Qingdao (CN); Yongjie Mao, Qingdao (CN); Shen Wang, Qingdao (CN)

(73) Assignee: CRRC QINGDAO SIFANG ROLLING STOCK RESEARCH INSTITUTE CO., LTD., Qingdao (CN)

(*) Notice: Subject to any disclaimer, the term of this patent is extended or adjusted under 35 U.S.C. 154(b) by 0 days.

(21) Appl. No.: 17/157,317

(22) Filed: Jan. 25, 2021

(65) Prior Publication Data
US 2021/0143752 A1 May 13, 2021

Related U.S. Application Data

(63) Continuation of application No. PCT/CN2019/101272, filed on Aug. 19, 2019.

(30) Foreign Application Priority Data

Mar. 20, 2019 (CN) .......................... 201910211533.7

(51) Int. Cl.
*H02M 7/493* (2007.01)
*H02M 7/5387* (2007.01)

(52) U.S. Cl.
CPC ....... *H02M 7/493* (2013.01); *H02M 7/53871* (2013.01)

(58) Field of Classification Search
CPC ........... H02M 2001/007; H02M 7/493; H02M 7/53871; H02M 7/49
(Continued)

(56) References Cited

U.S. PATENT DOCUMENTS

| | | | | |
|---|---|---|---|---|
| 6,549,441 B1 * | 4/2003 | Aigner | ................... | B23K 9/095 219/130.21 |
| 7,596,008 B2 * | 9/2009 | Iwata | ................... | H02M 7/5387 363/71 |

(Continued)

FOREIGN PATENT DOCUMENTS

| CN | 102437589 A | 5/2012 |
|---|---|---|
| CN | 105490571 A | 4/2016 |

(Continued)

OTHER PUBLICATIONS

International Search Report of PTC/CN2019/101272.
(Continued)

*Primary Examiner* — Gary L Laxton
(74) *Attorney, Agent, or Firm* — J.C. Patents

(57) ABSTRACT

A parallel control method and a parallel control system for single-phase inverters and an inverter. Acquiring an output voltage and an output current of each of the single-phase inverters; transforming a voltage and a current in static abc coordinates into dq coordinates by reconstruction and coordinate transformation so as to realize decoupling of the voltage and the current; transforming an output voltage command value of a current loop in dq coordinates into abc (Continued)

coordinates by coordinate transformation; and modulating and generating modulation waves according to an output voltage command value in abc coordinates to control a switching of a power device. In the present application, a plurality of single-phase inverters are controlled to be connected in parallel and are simultaneously started to work, after one of the single-phase inverters is faulted, any other single-phase inverter automatically bears the load of the faulted single-phase inverter, so that a problem of restarting delay of a mutual backup module is solved, a real uninterrupted power supply of the power supply is realized, high reliability is achieved, and influences to vehicle driving are avoided.

12 Claims, 2 Drawing Sheets

(58) Field of Classification Search
USPC .................................................. 363/65, 71
See application file for complete search history.

(56) References Cited

U.S. PATENT DOCUMENTS

| | | | |
|---|---|---|---|
| 8,842,454 B2* | 9/2014 | Johnson | H02J 3/385 363/71 |
| 2012/0101645 A1 | 4/2012 | Jun, II | |
| 2013/0264984 A1* | 10/2013 | Tamura | H02P 27/06 318/400.27 |

FOREIGN PATENT DOCUMENTS

| CN | 105529950 A | 4/2016 |
|---|---|---|
| CN | 106026744 A | 10/2016 |
| CN | 106655276 A | 5/2017 |
| CN | 107069819 A | 8/2017 |
| CN | 107104606 A | 8/2017 |
| CN | 109921671 A | 6/2019 |

OTHER PUBLICATIONS

Search Report of the priority application CN201910211533.7.
NPL1: "Research On Current Type Seamless Transfer Scheme Designed for Parallel Inverters System", by Bonan Sun, Thesis for Master Degree, Harbin Institute of Technology, Jul. 2017 (relevant part only).
NPL2: "Research on High Performance Control of Locomotive Auxiliary Power Inverter", by Jin Li, Thesis for Master Degree, Beijing Jiaotong University, Jun. 2015.
NPL3: "Research on the Parallel Technique of Three Phase Microgrid Inverter with Droop Control" by Bowen Niu, Thesis for Master Degree, Nanjing University of Aeronautics and Astronautics, Jan. 2016.

* cited by examiner

PARALLEL CONTROL METHOD AND SYSTEM FOR SINGLE-PHASE INVERTERS AND INVERTER

CROSS-REFERENCE TO RELATED APPLICATIONS

This application is a continuation of PCT/CN2019/101272 filed on Aug. 19, 2019, which claims the priority benefit of Chinese patent application No. 201910211533.7 filed on Mar. 20, 2019. The entirety of the above-mentioned patent applications is hereby incorporated by reference herein and made a part of this specification.

TECHNICAL FIELD

The present application belongs to the technical field of power and electrons, relates to the inverter technology and in particular to a parallel control method and a parallel control system for single-phase inverters and an inverter.

BACKGROUND ART

An internal combustion locomotive is a locomotive of which wheels are driven by a gearing by virtue of motive power from an internal combustion engine. So far, a great number of internal combustion locomotives are still retained to be used in China, and each of the internal combustion locomotives adopts a power generation car to provide the whole train with a 3AC380V power supply which supplies power for systems such as an air conditioning system and an illumination system. Since the power generation car has defects such as high operation cost and environment pollution, at present, it is gradually reformed into an electric locomotive, and the reformed electric locomotive draws power from an overhead contact system so as to supply power for loads on the whole train. Due to the existence of a neutral section, the train is in a no-power state when passing through the neutral section, the systems such as the air conditioning system and the illumination system cannot normally work, in order to keep illumination demands of passengers when passing through the neutral section, a storage battery and an under-vehicle power supply are additionally provided, and power is supplied for the illumination system in the neutral section through the storage battery and single-phase inverters, so that it is ensured that uninterrupted illumination is provided for the passengers to avoid the problem such as panic among the passengers and the like.

Compared with single-phase inverters of an ordinary train, the single-phase inverters after the power generation car is reformed is used as an uninterrupted power supply to continuously supply power for the illumination system when running and is required to work for a long time, and thus, a requirement for the reliability of the illumination system is increased. At present, a solution of mutual backup redundancy of double inverter modules is generally adopted: a box is internally provided with two single-phase inverter modules, and normally, one of the inverter modules works, and the other inverter module is standby; and when one of the modules is faulted, the other module is started and mutually backed up by a contactor so as to further supply power for loads. In such a way, the stability of the illumination system can be improved to a certain extent. However, during mutual backup switching of the two modules, both the starting of the standby module and the engagement of the contactor for mutual backup are delayed, in the meanwhile, the single-phase inverter has no outputs, so that the normal work of the illumination system cannot be kept, it is difficult to guarantee uninterrupted illumination for the passengers, and the problem of panic among the passengers due to illumination interruption can still appear.

SUMMARY

For solving the above-mentioned problem such as power supply discontinuity caused by no outputs from single-phase inverters due to delay during mutual backup switching of the single-phase inverters, the present application provides a parallel control method and a parallel control system for single-phase inverters to supply power uninterruptedly during switching and an inverter.

In order to achieve the above-mentioned purpose, the present application provides a parallel control method for single-phase inverters, used in a single-phase inverters parallel system comprising a plurality of single-phase inverters to control an output voltage and an output current of each of the single-phase inverters and equally divide output currents of the plurality of single-phase inverters; wherein, the parallel control method comprises the specific steps as follows:

acquiring the output voltage and the output current of each of the single-phase inverters;

reconstructing the acquired voltage variable and the acquired current variable, virtualizing orthogonal virtual quantities each with a phase difference of 90 degrees from a phase of the acquired voltage variable or the acquired current variable, respectively, and simulating orthogonal components of the single-phase inverters parallel system in $\alpha\beta$ coordinates;

transforming the orthogonal components in the $\alpha\beta$ coordinates into direct current components in dq coordinates;

calculating instantaneous active power P and instantaneous reactive power Q;

detecting a phase of an alternating current bus, and controlling a target value of an output q-axis direct current component in the dq coordinates to be zero to make phases of the plurality of single-phase inverters performing parallel output same;

controlling an output frequency of each of the single-phase inverters to make output phases of the plurality of single-phase inverters same so as to equally divide ctive powers, and controlling an output amplitude of each of the single-phase inverters to make amplitudes of output voltages of the plurality of single-phase inverters identical so as to equally divide reactive powers;

respectively performing closed-loop control on d-axis direct current components and q-axis direct current components in the dq coordinates to obtain an output voltage command value in axes dq;

transforming the output voltage command value in the dq coordinates into an output voltage command value in the $\alpha\beta$ coordinates, and transforming the output voltage command value in the $\alpha\beta$ coordinates into an output voltage command value in abc coordinates; and modulating and generating control signal SPWM pulses for regulating the output voltage of each of the single-phase inverters according to the output voltage command value in the abc coordinates.

Preferably, the acquired voltage variable and the acquired current variable are reconstructed by adopting a second-order generalized integrator, the second-order generalized integrator has an input Vin and two outputs which are respectively Vo and qVo, wherein the output Vo has same phase and amplitude with the input Vin, and the output qVo has same amplitude with the input Vin and has a lag of 90 degrees with respect to the input Vin in terms of phase, and transfer functions between the two outputs and the input are that:

$$D(s) = \frac{v_o(s)}{v_{in}(s)} = \frac{k\omega_0 s}{s^2 + k\omega_0 s + \omega_0^2} \quad (1)$$

$$Q(s) = \frac{qv_o(s)}{v_{in}(s)} = \frac{k\omega_0^2}{s^2 + k\omega_0 s + \omega_0^2}$$

in the formulas, k represents an attenuation coefficient, and $\omega_0$ represents a resonant angular frequency;

after a s-domain transfer function is discretized, difference equations are obtained as:

$$y_{o1}(k) = \frac{2k\omega_0 T}{4 + 2k\omega_0 T + \omega_0^2 T^2} x(k) - \frac{2k\omega_0 T}{4 + 2k\omega_0 T + \omega_0^2 T^2} x(k-2) + \quad (2)$$
$$\frac{8 - 2\omega_0^2 T^2}{4 + 2k\omega_0 T + \omega_0^2 T^2} y_{o1}(k-1) - \frac{4 - 2k\omega_0 T + \omega_0^2 T^2}{4 + 2k\omega_0 T + \omega_0^2 T^2} y_{o1}(k-2)$$

$$y_{o2}(k) = \frac{k\omega_0^2 T^2}{4 + 2k\omega_0 T + \omega_0^2 T^2} x(k) +$$
$$\frac{2k\omega_0^2 T^2}{4 + 2k\omega_0 T + \omega_0^2 T^2} x(k-1) + \frac{k\omega_0^2 T^2}{4 + 2k\omega_0 T + \omega_0^2 T^2} x(k-2) +$$
$$\frac{8 - 2\omega_0^2 T^2}{4 + 2k\omega_0 T + \omega_0^2 T^2} y_{o2}(k-1) - \frac{4 - 2k\omega_0 T + \omega_0^2 T^2}{4 + 2k\omega_0 T + \omega_0^2 T^2} y_{o2}(k-2)$$

in the formulas, T represents a sampling period of the system, x(k) represents an input of the second-order generalized integrator in a current period, x(k−1) represents an input of the second-order generalized integrator in a previous period, x(k−2) represents an input of the second-order generalized integrator in a period prior to the previous period, $y_{o1}(k)$ represents an output of the second-order generalized integrator in the current period, $y_{o1}(k-1)$ represents an output of the second-order generalized integrator in the previous period, $y_{o1}(k-2)$ represents an output of the second-order generalized integrator in the period prior to the previous period, $y_{o2}(k)$ represents an output of the second-order generalized integrator in the current period and has a lag of 90 degrees with respect to $y_{o1}(k)$ in terms of phase, $y_{o2}(k-1)$ represents an output of the second-order generalized integrator in the previous period, and $y_{o2}(k-2)$ represents an output of the second-order generalized integrator in the period prior to the previous period;

the output $y_{o1}(k)$ of the second-order generalized integrator in the current period and the output $y_{o2}(k)$ of the second-order generalized integrator in the current period are discretized orthogonal components finally output by the second-order generalized integrator.

Preferably, the orthogonal components in the αβ coordinates are transformed into the direct current components in the dq coordinates by PARK transformation, wherein transformation formulas are that:

$$\begin{cases} U_d = U_\alpha * \cos(\theta) + U_\beta * \sin(\theta) \\ U_q = U_\beta * \cos(\theta) - U_\alpha * \sin(\theta) \end{cases} \quad (3)$$

in the formulas, $U_d$ represents a d-axis direct current voltage component in the dq coordinates, and $U_q$ represents a q-axis direct current voltage component in the dq coordinates; and $U_\alpha$ represents an a-axis orthogonal voltage component in the αβ coordinates, and $U_\beta$ represents a β-axis orthogonal voltage component in the αβ coordinates.

Preferably, the phase of the alternating current bus is detected by phase-locked loop, and the target value of the output q-axis direct current component in the dq coordinates is controlled to be zero by a PI controller to make the phases of the plurality of single-phase inverters performing parallel output same; specific steps are: acquiring a voltage of the alternating current bus, and constructing an orthogonal component having a lag of 90 degrees with respect to the voltage of the bus in the αβ coordinates by using the second-order generalized integrator; transforming the orthogonal component in the αβ coordinates into direct current components in the dq coordinates by PARK transformation, and calculating a d-axis direct current voltage component $U_d$ and a q-axis direct current voltage component $U_q$ in the dq coordinates; and when a q-axis direct current voltage component $U_q$ output by one of the single-phase inverters is equal to zero, an output phase of the single-phase inverter is identical to the phase of the bus, and controlling, by the PI controller, the target value of the output q-axis direct current voltage component $U_q$ to be zero to form closed-loop regulation so as to make the phases of the plurality of single-phase inverters performing parallel output same.

Preferably, acquiring output voltages and output currents of each of the single-phase inverters at a current moment and a previous moment to calculate the instantaneous active power P and the instantaneous reactive power Q, wherein calculation formulas of the instantaneous active power P and the instantaneous reactive power Q are that:

$$P = \frac{1}{2\sin^2 x}(U_{k-1}I_{k-1} + U_k I_k) - \frac{\cos x}{2\sin^2 x}(U_{k-1}I_k + U_k I_{k-1}) \quad (4)$$

$$Q = \frac{1}{2\sin x}(U_{k-1}I_k - U_k I_{k-1})$$

in the formulas, $U_k$ represents a sampling value of an output voltage at a current moment, $I_k$ represents a sampling value of an output current at the current moment, $U_{k-1}$ represents a sampling value of an output voltage at a previous moment, $I_{k-1}$ represents a sampling value of an output current at the previous moment, and x=2π/N, wherein N represents a ratio of a power frequency period to a sampling period.

Preferably, each of the single-phase inverters detects an active power and a reactive power output by itself, and the active power output by a single-phase inverter of which the phase is advanced is greater than the active power output by a single-phase inverter of which the phase is lagged; the output frequency of each of the single-phase inverters is controlled by droop control to make the output phases of the plurality of single-phase inverters same so as to equally divide the active powers; the output amplitude of each of the single-phase inverters is controlled by droop control to make the amplitudes of the output voltages of the plurality of single-phase inverters identical so as to equally divide the reactive powers; and droop correspondences of the droop control are that:

$$\begin{cases} f = f_0 - k_P * P \\ V = V_0 - k_Q * Q \end{cases} \quad (5)$$

in the formulas, f represents an output frequency, $f_0$ represents an initial frequency, $k_P$ represents a droop coefficient of the active power, V represents an amplitude of an output voltage, and $V_0$ represents an amplitude of an initial voltage, and $k_Q$ represents a droop coefficient of the reactive power.

Preferably, the droop coefficients in the droop control is corrected in a process that the plurality of single-phase inverters are started in parallel, and corrected droop correspondences are that:

$$\begin{cases} f = f_0 - K_f * k_P * P \\ V = V_0 - K_V * k_Q * Q \end{cases} \quad (6)$$

in the formulas, $K_f$ represents a frequency correction coefficient, and $K_V$ represents an amplitude correction coefficient.

Preferably, the closed-loop control on the d-axis direct current components and the q-axis direct current components in the dq coordinates are respectively performed in a way of voltage and current double-loop control to obtain the output voltage command value in the axes dq; specific steps are: calculating a difference of a reference command value $U_{dref}$ of a d-axis voltage loop and a voltage output value $U_d$, then, enabling the different to enter a PI controller of the d-axis voltage loop, taking an output of the PI controller of the d-axis voltage loop as a reference command value $I_{dref}$ of a d-axis current loop, calculating a difference of the reference command value $I_{dref}$ of the d-axis current loop and an actual current output value $I_d$, and then, enabling the different to enter a PI controller of the d-axis current loop; calculating a difference of a reference command value $U_{qref}$ of a q-axis voltage loop and a voltage output value $U_q$, then, enabling the different to enter a PI controller of the q-axis voltage loop, taking an output of the PI controller of the q-axis voltage loop as a reference command value $I_{qref}$ of a q-axis current loop, calculating a difference of the reference command value $I_{qref}$ of the q-axis current loop and an actual current output value $I_q$, and then, enabling the different to enter a PI controller of the q-axis current loop; and performing cross decoupling on an output value of the d-axis current loop and an output value of the q-axis current loop to obtain the output voltage command value in the axes dq.

Preferably, the output voltage command values in the dq coordinates is transformed into the output voltage command value in the αβ coordinates by IPARK transformation, and the output voltage command value in the αβ coordinates is transformed into the output voltage command value in the abc coordinates by ICLARKE transformation.

Preferably, the control signal SPWM pulses for regulating the output voltage of each of the single-phase inverters are generated according to the output voltage command value in the abc coordinates; specific steps are: constructing two sinusoidal modulation waves $U_a$ and $U_b$ having same amplitudes and opposite phases according to the output voltage command value in the abc coordinates, wherein the two sinusoidal modulation waves share a triangular wave $U_c$ as a carrier wave; respectively comparing the sinusoidal modulation waves $U_a$ and $U_b$ with the triangular wave $U_c$ to obtain two SPWM waves $U_{g1}$ and $U_{g3}$, wherein the SPWM wave $U_{g1}$ is used as a driving signal of a switching tube Q1 of each of the single-phase inverters, a reverse signal $U_{g2}$ corresponding to $U_{g1}$ is used as a driving signal of a switching tube Q2 of each of the single-phase inverters, the SPWM wave $U_{g3}$ is used as a driving signal of a switching tube Q3 of each of the single-phase inverters, and a reverse signal $U_{g4}$ corresponding to $U_{g3}$ is used as a driving signal of a switching tube Q4 of each of the single-phase inverters; sampling the sinusoidal modulation waves on a peak or trough position of the carrier wave; and generating four control signal SPWM pulses for regulating the output voltage of each of the single-phase inverters by virtue of a comparison module of a digital signal processor.

In order to achieve the above-mentioned purpose, the present application further provides a parallel control system for single-phase inverters, comprising:

a device configured to acquire an output voltage and an output current of each of the single-phase inverters;

a device configured to reconstruct the acquired voltage variable and the acquired current variable, virtualize orthogonal virtual quantities each with a phase difference of 90 degrees from a phase of the acquired voltage variable or the acquired current variable, respectively, and simulate orthogonal components of a single-phase inverters parallel system in αβ coordinates;

a device configured to transform the orthogonal components in the αβ coordinates into direct current components in dq coordinates;

a device configured to calculate instantaneous active power P and instantaneous reactive power Q;

a device configured to detect a phase of an alternating current bus, and control a target value of an output q-axis direct current component in the dq coordinates to be zero to make phases of the plurality of single-phase inverters performing parallel output same;

a device configured to control an output frequency of each of the single-phase inverters to make output phases of the plurality of single-phase inverters same so as to equally divide active powers, and control an output amplitude of each of the single-phase inverters to make amplitudes of output voltages of the plurality of single-phase inverters identical so as to equally divide reactive powers;

a device configured to respectively perform closed-loop control on d-axis direct current components and q-axis direct current components in the dq coordinates to obtain an output voltage command value in axes dq;

a device configured to transform the output voltage command value in the dq coordinates into an output voltage command value in the αβ coordinates, and transform the output voltage command value in the αβ coordinates into an output voltage command value in abc coordinates; and a control unit configured to modulate and generate control signal SPWM pulses for regulating the output voltage of each of the single-phase inverters according to the output voltage command value in the abc coordinates.

Preferably, the parallel control system for single-phase inverters specifically comprises:

a voltage and current reconstruction device, that is, a device configured to perform voltage and current reconstruction on the acquired voltage variable and the acquired current variable by adopting a second-order generalized integrator;

a PARK transformation device, that is, a device configured to transform the orthogonal components in the αβ coordinates into the direct current components in the dq coordinates by PARK transformation;

a power calculation device, that is, a device configured to calculate the instantaneous active power and the instantaneous reactive power by adopting voltages and currents at a current moment and a previous moment;

a phase-locked loop device, that is, a device configured to detect the phase of the alternating current bus by adopting phase-locked loop, and control the target value of the output q-axis direct current component in the dq coordinates to be zero to make the phases of the plurality of single-phase inverters performing parallel output same;

a droop control device, that is, a device configured to control the output frequency to equally divide the active powers and control the output amplitude to equally divide the reactive powers in a way of synchronous starting droop control;

a voltage and current double-loop control device, that is, a device configured to perform the closed-loop control in a way of voltage and current double-loop control to obtain the output voltage command value in axes dq;

a coordinate transformation device, that is, a device configured to transform the output voltage command value in the dq coordinates into the output voltage command value in the αβ coordinates by IPARK transformation, and transform the output voltage command value in the αβ coordinates into the output voltage command value in abc coordinates by ICLARKE transformation; and a unipolar frequency multiplication modulation unit, that is, a control unit configured to modulate and generate the control signal SPWM pulses for regulating the output voltage of each of the single-phase inverters according to the output voltage command value in the abc coordinates.

Preferably, the acquired output voltage and the acquired output current of each of the single-phase inverters comprise an output voltage and an output current at a current moment as well as an output voltage and an output current at a previous moment.

Further, the parallel control system for single-phase inverters further comprises a device configured to correct droop coefficients of the output frequency and the output amplitude during parallel starting.

In order to achieve the above-mentioned purpose, the present application further provides an inverter, comprising a plurality of parallel single-phase inverters, wherein all the single-phase inverters have same structure; the inverter further comprises the parallel control system for single-phase inverters, and both a boost chopper circuit and an inverter circuit of each of the single-phase inverters are connected with the control unit of the parallel control system for single-phase inverters.

Compared with the prior art, the present application has the following advantages and beneficial effects:

(1) According to the present application, the plurality of single-phase inverters are controlled to be connected in parallel and are simultaneously started to work, after one of the single-phase inverters is faulted, any other single-phase inverter automatically bears the load of the faulted single-phase inverter, so that a problem of restarting delay of a mutual backup module is solved, a real uninterrupted power supply of the power supply is realized, high reliability is achieved, and influences to vehicle driving are avoided.

(2) According to the present application, the acquired output voltage and output current are reconstructed by adopting the second-order generalized integrator, and adaptive filtration is performed while the orthogonal components are constructed, so that the anti-jamming capability of the system is improved, the phase-locking precision is high, and an impact current generated during grid connection is effectively inhibited.

(3) According to the present application, the output power is calculated by adopting a novel instantaneous power calculation method, the instantaneous active power and the instantaneous reactive power can be calculated by only adopting sampling values at two adjacent moments instead of an integral unit, so that influences of integral delay in traditional power calculation to stability and dynamic property are overcome. After the load is suddenly changed, the instantaneous power can be obtained within only one period, so that calculation delay is shortened, and the dynamic tracking property is good. By adopting the novel instantaneous power calculation method, real-time calculation of a trigonometric function is not needed, so that the calculated amount of a control algorithm is reduced, and fewer DSP resources are occupied.

(4) A synchronous starting droop control strategy is adopted in the present application, and the droop coefficients are corrected during parallel starting, so that a droop effect is improved, the impact current generated during grid connection can be rapidly inhibited, the problem of relatively weak droop control during starting is solved, the working range of the parallel system is widened, and the success rate of parallel starting is increased.

(5) A unipolar frequency multiplication modulation way is adopted in the present application, so that the switching frequencies of the four switching tubes of the single-phase inverters are same with a frequency of the carrier, the pulse frequency output by the inverter is doubled under the condition that the switching frequency of a power device is not changed, the size and weight of a filter such as a reactor and a capacitor are greatly reduced, and the costs of the single-phase inverters are reduced.

DETAILED DESCRIPTION OF EMBODIMENTS

The present application is specifically described below by exemplary implementations. However, it should be understood that, without further description, elements, structures and features of one implementation can also be beneficially combined into other implementations.

Figure 1:
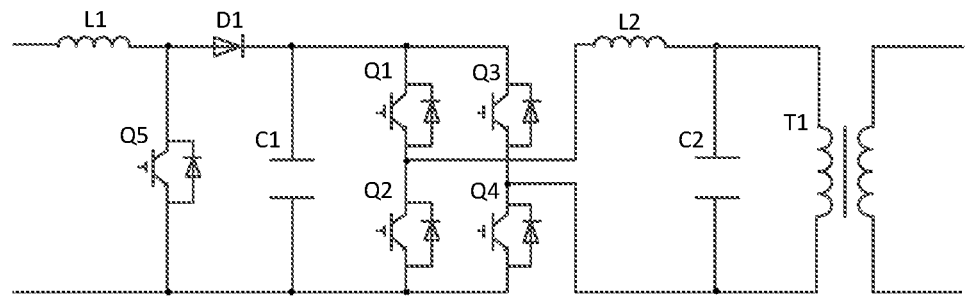
FIG. 1 is a schematic diagram showing a main circuit topological structure of a single-phase inverter in an embodiment of the present application.

In embodiments of the present application, each of related single-phase inverters comprises a boost chopper circuit and an inverter circuit, and a main circuit topology of the single-phase inverter is shown as FIG. 1. The boost chopper circuit is composed of a boost reactor L1, a diode D1 and a switching tube Q5, and the input DC48V of a storage battery is boosted to DC200V. The inverter circuit comprises an inverter bridge composed of four switching tubes Q1, Q2, Q3 and Q4 and a filter composed of a reactor L2 and a capacitor C2. The single-phase inverter outwards outputs a voltage after being isolated and boosted by a transformer T1 and provides a single-phase alternating current power for a train after inverting DC200V into AC220V.

Figure 2:
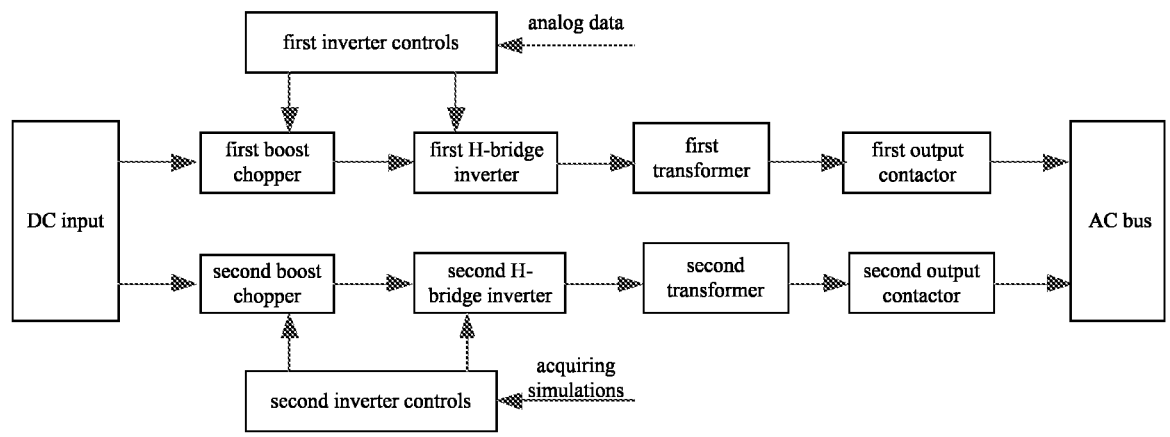
FIG. 2 is a block diagram showing a structure of a single-phase inverters parallel system in an embodiment of the present application.

In embodiments of the present application, a related single-phase inverters parallel system at least comprises two parallel single-phase inverters, that is, the single-phase inverters parallel system may comprise two, three, four or more parallel single-phase inverters which are specifically determined according to an actual demand. With a single-phase inverters parallel system comprising the two parallel single-phase inverters as an example, referring to the single-phase inverters parallel system as shown in FIG. 2, the two single-phase inverters in the system are same in structure and work in parallel without primary and secondary consideration.

An embodiment of the present application provides a parallel control method for single-phase inverters. An output voltage and an output current of each of the single-phase inverters are acquired; a voltage and a current in static abc coordinates are transformed in dq coordinates by reconstruction and coordinate transformation so as to be decoupled; an output voltage command value in axes dq is acquired by closed-loop control; the output voltage command value in the dq coordinates is transformed into an output voltage command value in the abc coordinates; and modulation waves are modulated and generated according to the output voltage command value in the abc coordinates to control a switching of a power device. The parallel control method comprises the specific steps as follows:

S1: an output voltage and an output current of each of the single-phase inverters are acquired;

S2: the acquired voltage variable and the acquired current variable are reconstructed, orthogonal virtual quantities each with a phase difference of 90 degrees from a phase of the acquired voltage variable or the acquired current variable, respectively, is virtualized, and orthogonal components of the single-phase inverters parallel system in $\alpha\beta$ coordinates is simulated;

S3: the orthogonal components in the $\alpha\beta$ coordinates are transformed into direct current components in dq coordinates;

S4: instantaneous active power P and instantaneous reactive power Q are calculated;

S5: a phase of an alternating current bus is detected, and a target value of an output q-axis direct current component in the dq coordinates is controlled to be zero to make phases of the plurality of single-phase inverters performing parallel output same and make a single-phase inverter not firstly started be capable of automatically tracking the alternating current bus so as to keep the phases identical and reduce an impact current generated during grid connection of the inverter not firstly started;

S6: an output frequency of each of the single-phase inverters is controlled to make output phases of the plurality of single-phase inverters same so as to equally divide active powers, and an output amplitude of each of the single-phase inverters is controlled to make amplitudes of output voltages of the plurality of single-phase inverters identical so as to equally divide reactive powers;

S7: closed-loop control on d-axis direct current components and q-axis direct current components in the dq coordinates are respectively performed to obtain an output voltage command value in the axes dq;

S8: the output voltage command value in the dq coordinates is transformed into an output voltage command value in the $\alpha\beta$ coordinates, and the output voltage command value in the $\alpha\beta$ coordinates is transformed into an output voltage command value in the abc coordinates; and S9: control signal SPWM pulses for regulating the output voltage of each of the single-phase inverters are modulated and generated according to the output voltage command value in the abc coordinates.

By using the above-mentioned parallel control method for single-phase inverters in the present application, the plurality of single-phase inverters are controlled to be connected in parallel and simultaneously started to work, and after one of the single-phase inverters is faulted, any other single-phase inverter automatically bears the load of the faulted single-phase inverter, so that the problem of restarting delay of a mutual backup module is solved, the real uninterrupted power supply of a power supply is realized, high reliability is achieved, and influences to vehicle driving are avoided.

Figure 3:
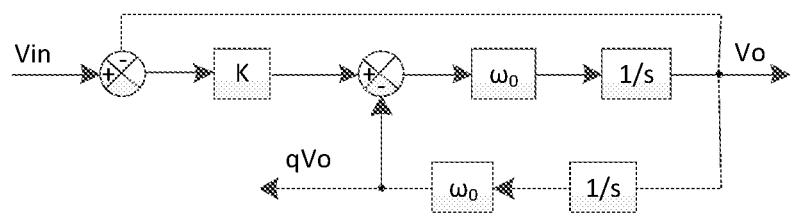
FIG. 3 is a schematic diagram showing a structure of a second-order generalized integrator in an embodiment of the present application.

In a preferred implementation of the above-mentioned parallel control method for single-phase inverters, in step S2, the acquired voltage variable and current variable are reconstructed by adopting a second-order generalized integrator, referring to FIG. 3, the second-order generalized integrator has an input Vin and two outputs which are respectively Vo and qVo, wherein the output Vo has same phase and amplitude with the input Vin, the output qVo has same amplitude with the input Vin and has a lag of 90 degrees with respect to the input Vin in terms of phase, and transfer functions between the two outputs and the input is that:

$$D(s) = \frac{v_o(s)}{v_{in}(s)} = \frac{k\omega_0 s}{s^2 + k\omega_0 s + \omega_0^2} \qquad (1)$$

$$Q(s) = \frac{qv_o(s)}{v_{in}(s)} = \frac{k\omega_0^2}{s^2 + k\omega_0 s + \omega_0^2}$$

in the formulas, D(s) represents a transfer function between the output Vo and the input Vin, Q(s) represents a transfer function between the output qVo and the input Vin, k represents an attenuation coefficient, and $\omega_0$ represents a resonant angular frequency.

After a s-domain transfer function is discretized, difference equations are obtained as:

$$y_{o1}(k) = \frac{2k\omega_0 T}{4 + 2k\omega_0 T + \omega_0^2 T^2} x(k) - \frac{2k\omega_0 T}{4 + 2k\omega_0 T + \omega_0^2 T^2} x(k-2) + \qquad (2)$$
$$\frac{8 - 2\omega_0^2 T^2}{4 + 2k\omega_0 T + \omega_0^2 T^2} y_{o1}(k-1) - \frac{4 - 2k\omega_0 T + \omega_0^2 T^2}{4 + 2k\omega_0 T + \omega_0^2 T^2} y_{o1}(k-2)$$

$$y_{o2}(k) = \frac{k\omega_0^2 T^2}{4 + 2k\omega_0 T + \omega_0^2 T^2} x(k) +$$
$$\frac{2k\omega_0^2 T^2}{4 + 2k\omega_0 T + \omega_0^2 T^2} x(k-1) + \frac{k\omega_0^2 T^2}{4 + 2k\omega_0 T + \omega_0^2 T^2} x(k-2) +$$
$$\frac{8 - 2\omega_0^2 T^2}{4 + 2k\omega_0 T + \omega_0^2 T^2} y_{o2}(k-1) - \frac{4 - 2k\omega_0 T + \omega_0^2 T^2}{4 + 2k\omega_0 T + \omega_0^2 T^2} y_{o2}(k-2)$$

in the formulas, T represents a sampling period of the system, x(k) represents an input of the second-order generalized integrator in a current period, x(k−1) represents an input of the second-order generalized integrator in a previous period, x(k−2) represents an input of the second-order generalized integrator in a period prior to the previous period, $y_{o1}(k)$ represents an output of the second-order generalized integrator in the current period, $y_{o1}(k-1)$ represents an output of the second-order generalized integrator in the previous period, $y_{o1}(k-2)$ represents an output of the second-order generalized integrator in the period prior to the previous period, $y_{o1}(k)$ represents an output, having a lag of 90 degrees with respect to $y_{o1}(k)$ in terms of phase, of the second-order generalized integrator in the current period, $y_{o2}(k-1)$ represents an output, having a lag of 90 degrees with respect to $y_{o1}(k-1)$ in terms of phase, of the second-order generalized integrator in the previous period, and $y_{o2}(k-2)$ represents an output, having a lag of 90 degrees with respect to $y_{o1}(k-2)$ in terms of phase, of the second-order generalized integrator in the period prior to the previous period.

The output $y_{o1}(k)$ of the second-order generalized integrator in the current period and the output $y_{o2}(k)$, having a lag of 90 degrees in terms of phase, of the second-order generalized integrator in the current period are discretized orthogonal components finally output by the second-order generalized integrator.

The output voltage and the output current are reconstructed by adopting the second-order generalized integrator, and the orthogonal component having a lag of 90 degrees in terms of phase is virtualized, so that problems such as filtration delay and poor dynamic response capability caused when orthogonal virtual signals are constructed by using a traditional method are solved. Due to the adoption of a reconstruction method in which the second-order generalized integrator is adopted, adaptive filtration can be performed to the acquisitions while the orthogonal virtual quantities are constructed, so that the anti-jamming capability of the system is improved. The constructed orthogonal virtual quantities not only can realize decoupling control on the axes dq, but also provides basis for the subsequent phase-locked loop, so that influences of an adverse factor such as a direct current component to phase-locking precision are eliminated, and an impact current generated during grid connection is effectively inhibited.

In a preferred implementation of the above-mentioned parallel control method for single-phase inverters, in step S3, the orthogonal components in the αβ coordinates are transformed into the direct current components in the dq coordinates by PARK transformation, wherein transformation formulas are that:

$$\begin{cases} U_d = U_\alpha * \cos(\theta) + U_\beta * \sin(\theta) \\ U_q = U_\beta * \cos(\theta) - U_\alpha * \sin(\theta) \end{cases} \quad (3)$$

in the formulas, $U_d$ represents a d-axis direct current voltage component in the dq coordinates, and $U_q$ represents a q-axis direct current voltage component in the dq coordinates; and $U_\alpha$ represents an α-axis orthogonal voltage component in the αβ coordinates, and $U_\beta$ represents a β-axis orthogonal voltage component in the αβ coordinates. Similarly, a current is transformed into a d-axis current component and a q-axis current component in the dq coordinates by the PARK transformation, and current transformation formulas are same as the above, the descriptions thereof are omitted herein.

Figure 4:
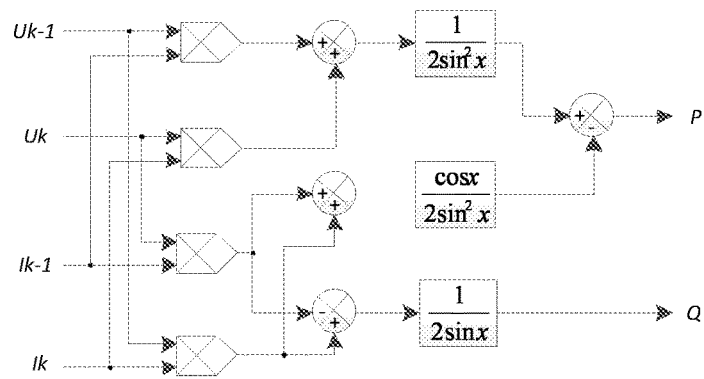
FIG. 4 is a schematic block diagram showing calculation of instantaneous power in an embodiment of the present application.

In a preferred implementation of the above-mentioned parallel control method for single-phase inverters, in step S4, the output voltages and the output currents of each of the single-phase inverters at a current moment and a previous moment are acquired, and the instantaneous active power P and the instantaneous reactive power Q are calculated, as shown in FIG. 4, wherein calculation formulas of the instantaneous active power P and the instantaneous reactive power Q are that:

$$P = \frac{1}{2\sin^2 x}(U_{k-1}I_{k-1} + U_k I_k) - \frac{\cos x}{2\sin^2 x}(U_{k-1}I_k + U_k I_{k-1}) \quad (4)$$

$$Q = \frac{1}{2\sin x}(U_{k-1}I_k - U_k I_{k-1})$$

in the formulas, $U_k$ represents a sampling value of an output voltage at a current moment, $I_k$ represents a sampling value of an output current at the current moment, $U_{k-1}$ represents a sampling value of an output voltage at a previous moment, $I_{k-1}$ represents a sampling value of an output current at the previous moment, and $x=2\pi/N$ wherein N represents a ratio of a power frequency period to a sampling period. The novel power calculation method is adopted, according to sine features of the output voltages and the output currents, the instantaneous powers can be calculated by only acquiring voltages and currents at two adjacent moments instead of an integral unit, so that influences of integral delay in traditional power calculation to stability and dynamic property are overcome. After the load is suddenly changed, the instantaneous power can be obtained within only one period, so that calculation delay is shortened, and the dynamic tracking property is good. By adopting the power calculation method, real-time calculation of a trigonometric function is not needed, so that the calculated amount of the control algorithm is reduced, and fewer digital signal processor (DSP) resources are occupied.

Figure 5:
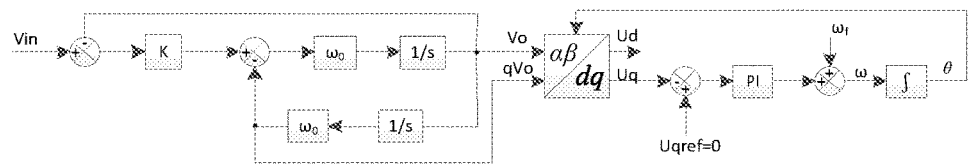
FIG. 5 is a schematic diagram showing phase-locked loop based on the second-order generalized integrator in an embodiment of the present application.

In a preferred implementation of the above-mentioned parallel control method for single-phase inverters, in step S5, the phase of the alternating current bus is detected by phase-locked loop, and the target value of the q-axis direct current component output by the bus in the dq coordinates is controlled to be zero by a PI controller to make the phases of the plurality of single-phase inverters performing parallel output same. Referring to FIG. 5, the specific steps are: a voltage of the alternating current bus is acquired, and an orthogonal component having a lag of 90 degrees with respect to the voltage of the bus in the αβ coordinates is constructed by using the second-order generalized integrator, referring to step 2; the orthogonal component in the αβ coordinates is transformed into the direct current components in the dq coordinates by PARK transformation, and a d-axis direct current voltage component $U_d$ and a q-axis direct current voltage component $U_q$ in the dq coordinates are calculated, referring to step 3; and when a q-axis direct current voltage component $U_q$ output by one of the single-phase inverter is equal to zero, an output phase of the single-phase inverter is identical to the phase of the bus, and the PI controller controls the target value of the q-axis direct current voltage component $U_q$ output by the bus to be zero to obtain the phase of the bus and to form closed-loop regulation, so as to make the phases of the plurality of single-phase inverters performing parallel output same. The phase of the alternating current bus is detected by the phase-locked loop, and the phases of the single-phase inverters are controlled to be same with the phase of the bus, so that the phases of the plurality of single-phase inverters performing parallel output are same, and the impact current generated at the moment of grid connection is reduced.

In a preferred implementation of the above-mentioned parallel control method for single-phase inverters, in step S6, each of the single-phase inverters detects an active power and an reactive power output by itself, and the active power output by a single-phase inverter of which the phase is advanced is greater than that output by a single-phase inverter of which the phase is lagged. The output frequency of each of the single-phase inverters is controlled by droop control to make the output phases of the plurality of single-phase inverters same so as to equally divide the active powers; the output amplitude of each of the single-phase inverters is controlled by droop control to make the amplitudes of the output voltages of the plurality of single-phase inverters identical so as to equally divide the reactive powers; and droop correspondences of the droop control are that:

$$\begin{cases} f = f_0 - k_P * P \\ V = V_0 - k_Q * Q \end{cases} \quad (5)$$

in the formulas, f represents an output frequency, $f_0$ represents an initial frequency, $k_P$ represents a droop coefficient of the active power, V represents an amplitude of an output voltage, and $V_0$ represents an amplitude of an initial voltage, and $k_Q$ represents a droop coefficient of the reactive power. Droop control without interconnecting wires in parallel is adopted, the synchronization of the phases and the equal division of the active powers are realized by frequency droop, and the equal division of the reactive powers is realized by amplitude droop, so that current sharing of the plurality of single-phase inverters are realized, and the phases of the grid-connected single-phase inverters are kept same.

In a preferred implementation of the above-mentioned parallel control method for single-phase inverters, in step S6, the droop coefficients in the droop control is corrected in a process that the plurality of single-phase inverters are started in parallel, and corrected droop correspondences are that:

$$\begin{cases} f = f_0 - K_f * k_P * P \\ V = V_0 - K_V * k_Q * Q \end{cases} \quad (6)$$

in the formulas, $K_f$ represents a frequency correction coefficient, and $K_v$ represents an amplitude correction coefficient, wherein $K_f$ and $K_v$ have the same value and are specifically calculated by using a method shown as follows:

$$K_f = K_v = U_{ref} * U_{ref}/(U*U) \quad (7)$$

in the formulas, $U_{ref}$ represents a target voltage value, and U represents a current voltage value.

The plurality of single-phase inverters are simultaneously powered and are started together. Moreover, the single-phase inverters are identical in structure and basically identical in main circuit delay so as not to be phase-locked during starting, but directly grid-connected during soft starting. During soft starting, the output voltages are very low, so that both the output active powers and reactive powers are very low, a droop effect is relatively weak, current sharing of the single-phase inverters are poor, and then, output oscillation is easily caused to result in breakdown of the parallel system. In the present application, adopted is the optimized synchronous starting droop control by which the compatibility of working conditions of soft starting and normal operation can be realized; the droop coefficients can be corrected, so that the droop effect can be enhanced; and the impact current generated during grid connection can be rapidly inhibited, so that it is ensured that the system is reliably started.

In a preferred implementation of the above-mentioned parallel control method for single-phase inverters, in step S7, the closed-loop control on the d-axis direct current components and the q-axis direct current components in the dq coordinates are respectively performed in a way of voltage and current double-loop control to obtain the output voltage command value in the axes dq. The specific steps are as follows: a difference of a reference command value $U_{dref}$ of a d-axis voltage loop and a voltage output value $U_d$ is calculated, then, the difference is enabled to enter a PI controller of the d-axis voltage loop, an output of the PI controller of the d-axis voltage loop is taken as a reference command value $I_{dref}$ of a d-axis current loop, a difference of the reference command value $I_{dref}$ of the d-axis current loop and an actual current output value $I_d$ is calculated, and then, the difference is enabled to enter a PI controller of the d-axis current loop; a difference of a reference command value $U_{qref}$ of a q-axis voltage loop and a voltage output value $U_q$ is calculated, then, the difference is enabled to enter a PI controller of the q-axis voltage loop, an output of the PI controller of the q-axis voltage loop is taken as a reference command value $I_{qref}$ of a q-axis current loop, a difference of the reference command value $I_{qref}$ of the q-axis current loop and an actual current output value $I_q$ is calculated, and then, the difference is enabled to enter a PI controller of the q-axis current loop; and cross decoupling on an output value of the d-axis current loop and an output value of the q-axis current loop is performed to obtain the output voltage command value in the dq coordinates. Due to the adoption of the voltage and current double-loop control, an outer loop of the voltage realizes the stability of an alternating current output voltage, and an inner loop of the current increases a response speed of the system on one hand, and plays a current limiting role on the other hand. In the present step, it should be noted that the above-mentioned reference command value $U_{dref}$ of the d-axis voltage loop is determined by the skilled in the art according to technical requirements of the single-phase inverters, and the reference command value $U_{qref}$ of the q-axis voltage loop is 0; the above-mentioned voltage output value $U_d$ and the voltage output value $U_q$ are respectively the d-axis direct current voltage component and the q-axis direct current voltage component obtained by transformation in step S3; and the above-mentioned actual current output value $I_d$ and the actual current output value $I_q$ are respectively the d-axis current component and the q-axis current component obtained by transformation in step S3.

In a preferred implementation of the above-mentioned parallel control method for single-phase inverters, in step S8, the output voltage command value in the dq coordinates is transformed into the output voltage command value in the αβ coordinates by IPARK transformation, and the output voltage command value in the αβ coordinates is transformed into the output voltage command value in the abc coordinates by ICLARKE transformation, wherein transformation formulas for the IPARK transformation are that:

$$\begin{cases} U_\alpha = U_d * \cos(\theta) - U_q * \sin(\theta) \\ U_\beta = U_d * \sin(\theta) + U_q^* \cos(\theta) \end{cases} \quad (7)$$

in the formulas, $U_\alpha$ represents a component of an output voltage command value in axis α in the αβ coordinates, $U_\beta$ represents a component of an output voltage command value in axis β in the αβ coordinates, $U_d$ represents an output voltage command value in axis d in the dq coordinates, and $U_q$ represents an output voltage command value in axis q in the dq coordinates.

Transformation formulas for the ICLARKE transformation are that:

$$\begin{cases} U_a = U_\alpha \\ U_b = -0.5 * U_\alpha + \dfrac{\sqrt{3}}{2} * U_\beta \\ U_c = -0.5 * U_\alpha - \dfrac{\sqrt{3}}{2} * U_\beta \end{cases} \quad (8)$$

in the formulas, $U_a$ represents a component of an output voltage command value in axis a in the abc coordinates, $U_b$ represents a component of an output voltage command value in axis b in the abc coordinates, and $U_c$ represents a component of an output voltage command value in axis c in the abc coordinates.

In a preferred implementation of the above-mentioned parallel control method for single-phase inverters, in step S9, the control signal SPWM pulses for regulating the output voltage of each of the single-phase inverters are generated according to the output voltage command value in the abc coordinates. The specific steps are as follows: two sinusoidal modulation waves $U_a$ and $U_b$ having same amplitudes and opposite phases are constructed according to the output voltage command value in the abc coordinates, wherein the two sinusoidal modulation waves share a triangular wave $U_c$ as a carrier wave; the sinusoidal modulation waves $U_a$ and $U_b$ are respectively compared with the triangular wave $U_c$ to obtain two SPWM waves $U_{g1}$ and $U_{g3}$, wherein the SPWM wave $U_{g1}$ is used as a driving signal of a switching tube Q1 of each of the single-phase inverters, a reverse signal $U_{g2}$ corresponding to $U_{g1}$ is used as a driving signal of a switching tube Q2 of each of the single-phase inverters, the SPWM wave $U_{g3}$ is used as a driving signal of a switching tube Q3 of each of the single-phase inverters, and a reverse signal $U_{g4}$ corresponding to $U_{g3}$ used as a driving signal of a switching tube Q4 of each of the single-phase inverters; the sinusoidal modulation waves are sampled on a peak or trough position of the carrier wave by using a symmetric regular sampling method; and four control signal SPWM pulses for regulating the output voltage of each of the single-phase inverters are generated by virtue of a comparison module of a DSP to drive the four switching tubes Q1, Q2, Q3 and Q4. A unipolar frequency multiplication modulation way is adopted, so that switching frequencies of the four switching tubes of the single-phase inverters are same with a frequency of the carrier, the pulse frequency output by the single-phase inverter is doubled under the condition that the switching frequency of a power device is not changed, the size and weight of a filter such as a reactor and a capacitor are greatly reduced, and the costs of the single-phase inverters are reduced.

An embodiment of the present application further provides a parallel control system for single-phase inverters, comprising:

a device configured to acquire an output voltage and an output current of each of the single-phase inverters;

a device configured to reconstruct the acquired voltage variable and the acquired current variable, virtualize orthogonal virtual quantities each with a phase difference of 90 degrees from a phase of the acquired voltage variable or the acquired current variable, respectively, and simulate orthogonal components of a single-phase inverters parallel system in αβ coordinates;

a device configured to transform the orthogonal components in the αβ coordinates into direct current components in dq coordinates;

a device configured to calculate instantaneous active power P and instantaneous reactive power Q;

a device configured to detect a phase of an alternating current bus, and control a target value of an output q-axis direct current component in the dq coordinates to be zero to make phases of the plurality of single-phase inverters performing parallel output same;

a device configured to control an output frequency of each of the single-phase inverters to make output phases of the plurality of single-phase inverters same so as to equally divide active powers, and control an output amplitude of each of the single-phase inverters to make amplitudes of output voltages of the plurality of single-phase inverters identical so as to equally divide reactive powers;

a device configured to respectively perform closed-loop control on d-axis direct current components and q-axis direct current components in the dq coordinates to obtain an output voltage command value in axes dq;

a device configured to transform the output voltage command value in the dq coordinates into an output voltage command value in the αβ coordinates, and transform the output voltage command value in the αβ coordinates into an output voltage command value in abc coordinates; and a control unit configured to modulate and generate control signal SPWM pulses for regulating the output voltage of each of the single-phase inverters according to the output voltage command value in the abc coordinates.

By using the above-mentioned parallel control method for single-phase inverters in the present application, the plurality of single-phase inverters are controlled to be connected in parallel and simultaneously started to work, and after one of the single-phase inverters is faulted, any other single-phase inverter automatically bears the load of the faulted single-phase inverter, so that the problem of restarting delay of a mutual backup module is solved, the real uninterrupted power supply of a power supply is realized, high reliability is achieved, and influences to vehicle driving are avoided.

In a preferred implementation of the above-mentioned parallel control system for single-phase inverters, the acquired output voltage and the acquired output current of each of the single-phase inverters comprise: an output voltage and an output current at a current moment as well as an output voltage and an output current at a previous moment. The instantaneous active power and the instantaneous reactive power can be calculated according to the acquired output voltages and the acquired output currents at the two moments including the current moment and the previous moment instead of an integral unit, so that influences of integral delay in traditional power calculation to stability and dynamic property are overcome. After the load is suddenly changed, the instantaneous power can be obtained within only one period, so that calculation delay is shortened, and the dynamic tracking property is good. Moreover, real-time calculation of a trigonometric function is not needed, so that calculated amount of the control algorithm is reduced, and fewer DSP resources are occupied.

Both control power and main power of the single-phase inverters are DC48V provided by a storage battery, and the plurality of single-phase inverters are simultaneously powered and are started together. The single-phase inverters are identical and basically identical in main circuit delay, so that there is a phenomenon that each of the single-phase inverters recognizes itself to be firstly started inverter during starting. Under such a working condition, the plurality of single-phase inverters are not phase-locked, but are directly grid-connected during soft starting. During soft starting, the output voltages are very low, so that both the output active powers and reactive powers are very low, a droop effect is relatively weak, current sharing of the single-phase inverters are poor, and then, output oscillation is easily caused to result in breakdown of the parallel system. In order to enhance the droop effect and rapidly inhibit an impact current generated during grid connection, in a preferred implementation of the above-mentioned parallel control system for single-phase inverters, the system further comprises a device configured to correct droop coefficients of an output frequency and an output amplitude during parallel starting. The droop coefficients of the output frequency and the output amplitude are corrected during parallel starting, so that the droop effect is enhanced, and it is ensured that the system is reliably started.

Figure 6:
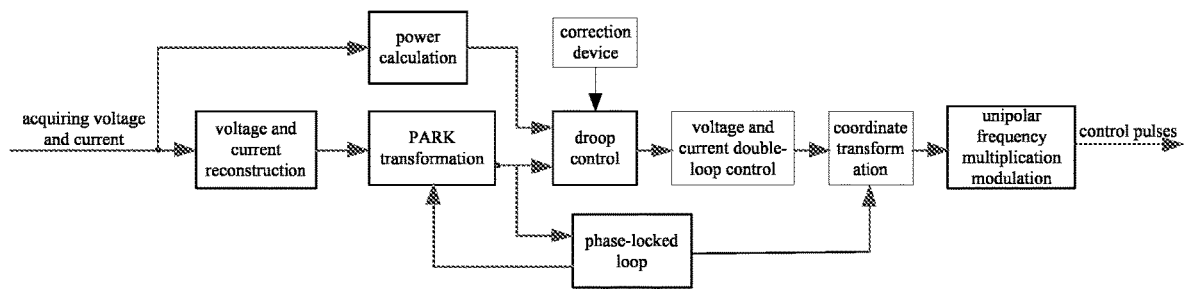
FIG. 6 is a block diagram showing a structure of a control system for single-phase inverters in an embodiment of the present application.

Referring to FIG. 6, in a preferred implementation of the parallel control system for single-phase inverters, the system comprises:

a voltage and current reconstruction device, that is, a device configured to perform voltage and current reconstruction on the acquired voltage variable and the acquired current variable by adopting a second-order generalized integrator, wherein due to the voltage and current reconstruction realized by adopting the second-order generalized integrator, not only are problems such as filtration delay and poor dynamic property of a traditional method for constructing orthogonal virtual signals solved, but also the acquired variables can be adaptively filtered, so that the anti-jamming capability of the system is improved; and constructed orthogonal vectors not only can realize decoupling control on the axes dq, but also provides the basis for the subsequent phase-locked loop, so that influences of an adverse factor such as a direct current component to phase-locking precision are eliminated, and the impact current generated during grid connection is effectively inhibited;

a PARK transformation device, that is, a device configured to transform an orthogonal component in the $\alpha\beta$ coordinates into the direct current component in the dq coordinates by PARK transformation;

a power calculation device, that is, a device configured to calculate instantaneous active power and instantaneous reactive power by adopting voltages and currents at a current moment and a previous moment, wherein the instantaneous active power and the instantaneous reactive power can be calculated by adopting sampling values at two adjacent moments instead of an integral unit, so that influences of integral delay in traditional power calculation to stability and dynamic property are overcome; after the load is suddenly changed, the instantaneous power can be obtained within only one period, so that calculation delay is shortened, and the dynamic tracking property is good; moreover, real-time calculation of a trigonometric function is not needed, so that the calculated amount of the control algorithm is reduced, and fewer DSP resources are occupied;

a phase-locked loop device, that is, a device configured to detect the phase of the alternating current bus by adopting phase-locked loop, and control the target value of an output q-axis direct current component in the dq coordinates to be zero to make the phases of the plurality of single-phase inverters performing parallel output same;

a droop control device, that is, a device configured to control the output frequency to equally divide the active powers and control an output amplitude to equally divide the reactive powers in a way of synchronous starting droop control, wherein due to the adoption of the synchronous starting droop control, the droop coefficients of the output frequency and the output amplitude are corrected during parallel starting, so that the droop effect is enhanced, and it is ensured that the system is reliably started;

a voltage and current double-loop control device, that is, a device configured to perform the closed-loop control in a way of voltage and current double-loop control to obtain the output voltage command value in axes dq;

a coordinate transformation device, that is, a device configured to transform the output voltage command value in the dq coordinates into the output voltage command value in the $\alpha\beta$ coordinates by IPARK transformation, and transform the output voltage command value in the $\alpha\beta$ coordinates into the output voltage command value in abc coordinates by ICLARKE transformation; and a unipolar frequency multiplication modulation unit, that is, a control unit configured to modulate and generate the control signal SPWM pulses for regulating the output voltage of each of the single-phase inverters according to the output voltage command value in the abc coordinates, wherein unipolar frequency multiplication modulation is adopted, so that the output pulse frequencies of the single-phase inverters are doubled under the condition that the switching frequency of a power device is not changed, the size and weight of a filter such as a reactor and a capacitor are greatly reduced, and the costs of the single-phase inverters are reduced.

The present application further provides an inverter comprising a plurality of parallel single-phase inverters, wherein all the single-phase inverters have same structure; the inverter further comprises the parallel control system for single-phase inverters, and both a boost chopper circuit and an inverter circuit of each of the single-phase inverters are connected with the control unit of the parallel control system for single-phase inverters. The plurality of single-phase inverters of the inverter are of mutual backup redundancy. Normally, the plurality of single-phase inverters are simultaneously started to work, one of the single-phase inverters supplies power to a load, and after the single-phase inverter is faulted, any other single-phase inverter is switched by a contactor to further supply power to the load. With the inverter comprising two parallel single-phase inverters as an example, normally, the two single-phase inverters are simultaneously started to work, one of the single-phase inverters supplies power to a load, after the single-phase inverter is faulted, the other single-phase inverter is mutually backed up by a contactor to further supply power to the load. Since the plurality of parallel single-phase inverters are simultaneously started, the networking time is shortened, and the starting reliability is high. During normal work, the plurality of single-phase inverters simultaneously work, so that the problem of restarting delay of an existing mutual backup module is solved, the uninterrupted power supply of a power supply is realized, and influences to vehicle driving are avoided.

The above-mentioned embodiments are intended to explain the present application, rather than to limit the present application. Any modifications and changes made on the present application within the spirit and the protective scope of claims of the present application fall within the protective scope of the present application.

The invention claimed is:

1. A parallel control method for single-phase inverters, used in a single-phase inverters parallel system comprising a plurality of single-phase inverters to control output voltages and output currents of each of the single-phase inverters and equally divide the output currents of the plurality of the single-phase inverters; wherein, the parallel control method comprises specific steps as follows:
   acquiring the output voltages and the output currents of each of the single-phase inverters, the output voltages and the output currents comprise a first output voltage and a first output current of each of the single-phase inverters at a current moment and a second output voltage and a second output current of each of the single-phase inverters at a previous moment;
   reconstructing the output voltages and the output currents, virtualizing orthogonal virtual quantities each with a phase difference of 90 degrees from a phase of each of the output voltages or the output currents, respectively, and simulating orthogonal components of the single-phase inverters parallel system in $\alpha\beta$ coordinates;
   transforming the orthogonal components in the $\alpha\beta$ coordinates into direct current components in dq coordinates;
   calculating instantaneous active power P and instantaneous reactive power Q, wherein calculation formulas of the instantaneous active power P and the instantaneous reactive power Q are that:

$$P = \frac{1}{2\sin^2 x}(U_{k-1}I_{k-1} + U_k I_k) - \frac{\cos x}{2\sin^2 x}(U_{k-1}I_k + U_k I_{k-1}) \quad (4)$$

$$Q = \frac{1}{2\sin x}(U_{k-1}I_k - U_k I_{k-1})$$

in the calculation formulas (4), $U_k$ represents a sampling value of the first output voltage at the current moment, $I_k$ represents a sampling value of the first output current at the current moment, $U_{k-1}$ represents a sampling value of the second output voltage at the previous moment, $I_{k-1}$ represents a sampling value of the second output current at the previous moment, and $x=2\pi/N$, wherein N represents a ratio of a power frequency period to a sampling period;
   detecting a phase of an alternating current bus, and controlling a target value of an output q-axis direct current component in the dq coordinates to be zero to make the plurality of the single-phase inverters outputting in parallel have the same phase;
   controlling an output frequency of each of the single-phase inverters by droop control to make output phases of the plurality of the single-phase inverters same so as to equally divide active powers, and controlling an output amplitude of each of the single-phase inverters by the droop control to make amplitudes of the output voltages of the plurality of the single-phase inverters identical so as to equally divide reactive powers; and droop correspondences of the droop control are shown in formulas (5):

$$\begin{cases} f = f_0 - k_P * P \\ V = V_0 - k_Q * Q \end{cases} \quad (5)$$

in the formulas (5), f represents the output frequency, $f_0$ represents an initial frequency, $k_P$ represents a droop coefficient of the instantaneous active power, V represents an amplitude of each of the output voltages, and $V_0$ represents an amplitude of an initial voltage, and $k_Q$ represents a droop coefficient of the instantaneous reactive power;
   making a reference command value $U_{dref}$ of a d-axis voltage loop equal to the amplitude V and a reference command value $U_{qref}$ of a q-axis voltage loop equal to 0; respectively performing closed-loop control on d-axis direct current components and q-axis direct current components in the dq coordinates to obtain first command value of the output voltages in axes dq;
   calculating a phase $\theta$ of each of the single-phase inverters according to the output frequency f of each of the single-phase inverters; transforming the first command value of the output voltages in the dq coordinates into a second command value of the output voltages in the $\alpha\beta$ coordinates, and transforming the second command value of the output voltages in the $\alpha\beta$ coordinates into a third command value of the output voltages in abc coordinates; and
   modulating and generating control signal SPWM pulses for regulating the output voltages of each of the single-phase inverters according to the third command value of the output voltages in the abc coordinates.

2. The parallel control method for single-phase inverters according to claim 1, wherein the output voltages and the output currents are reconstructed by adopting a second-order generalized integrator, the second-order generalized integrator has an input Vin and two outputs which are respectively Vo and qVo, wherein the output Vo has same phase and amplitude with the input Vin, and the output qVo has same amplitude with the input Vin and has a lag of 90 degrees with respect to the input Vin in terms of phase, and transfer functions between the two outputs and the input are that:

$$D(s) = \frac{v_o(s)}{v_{in}(s)} = \frac{k\omega_0 s}{s^2 + k\omega_0 s + \omega_0^2} \quad (1)$$

$$Q(s) = \frac{qv_o(s)}{v_{in}(s)} = \frac{k\omega_0^2}{s^2 + k\omega_0 s + \omega_0^2}$$

in the transfer functions (1), k represents an attenuation coefficient, and $\omega_0$ represents a resonant angular frequency;
   after a s-domain transfer function is discretized, difference equations are obtained as:

$$y_{o1}(k) = \frac{2k\omega_0 T}{4 + 2k\omega_0 T + \omega_0^2 T^2} x(k) - \frac{2k\omega_0 T}{4 + 2k\omega_0 T + \omega_0^2 T^2} x(k-2) + \quad (2)$$
$$\frac{8 - 2\omega_0^2 T^2}{4 + 2k\omega_0 T + \omega_0^2 T^2} y_{o1}(k-1) - \frac{4 - 2k\omega_0 T + \omega_0^2 T^2}{4 + 2k\omega_0 T + \omega_0^2 T^2} y_{o1}(k-2)$$

$$y_{o2}(k) = \frac{k\omega_0^2 T^2}{4 + 2k\omega_0 T + \omega_0^2 T^2} x(k) +$$
$$\frac{2k\omega_0^2 T^2}{4 + 2k\omega_0 T + \omega_0^2 T^2} x(k-1) + \frac{k\omega_0^2 T^2}{4 + 2k\omega_0 T + \omega_0^2 T^2} x(k-2) +$$
$$\frac{8 - 2\omega_0^2 T^2}{4 + 2k\omega_0 T + \omega_0^2 T^2} y_{o2}(k-1) - \frac{4 - 2k\omega_0 T + \omega_0^2 T^2}{4 + 2k\omega_0 T + \omega_0^2 T^2} y_{o2}(k-2)$$

in the difference equations (2), T represents the sampling period of the system, x(k) represents a first input of the second-order generalized integrator in a current period, x(k−1) represents a second input of the second-order generalized integrator in a previous period, x(k−2)

represents a third input of the second-order generalized integrator in a period prior to the previous period, $y_{o1}(k)$ represents a first output of the second-order generalized integrator in the current period, $y_{o1}(k-1)$ represents a second output of the second-order generalized integrator in the previous period, $y_{o1}(k-2)$ represents a third output of the second-order generalized integrator in the period prior to the previous period, $y_{o2}(k)$ represents a fourth output of the second-order generalized integrator in the current period and has a lag of 90 degrees with respect to $y_{o1}(k)$ in terms of phase, $y_{o2}(k-1)$ represents a fifth output of the second-order generalized integrator in the previous period, and $y_{o2}(k-2)$ represents a sixth output of the second-order generalized integrator in the period prior to the previous period;

the first output $y_{o1}(k)$ of the second-order generalized integrator in the current period and the fourth output $y_{o2}(k)$ of the second-order generalized integrator in the current period are discretized orthogonal components finally output by the second-order generalized integrator.

3. The parallel control method for single-phase inverters according to claim 2, wherein the orthogonal components in the αβ coordinates are transformed into the direct current components in the dq coordinates by PARK transformation, wherein transformation formulas are that:

$$\begin{cases} U_d = U_\alpha * \cos(\theta) + U_\beta * \sin(\theta) \\ U_q = U_\beta * \cos(\theta) - U_\alpha * \sin(\theta) \end{cases} \quad (3)$$

in the transformation formulas (3), $U_d$ represents a d-axis direct current voltage component in the dq coordinates, and $U_q$ represents a q-axis direct current voltage component in the dq coordinates; and $U_\alpha$ represents an a-axis orthogonal voltage component in the αβ coordinates, and $U_\beta$ represents a p-axis orthogonal voltage component in the αβ coordinates.

4. The parallel control method for single-phase inverters according to claim 3, wherein the phase of the alternating current bus is detected by phase-locked loop, and the target value of the output q-axis direct current component in the dq coordinates is controlled to be zero by a PI controller to make the plurality of the single-phase inverters outputting in parallel have the same phase; specific steps are: acquiring a voltage of the alternating current bus, and constructing the orthogonal components each having a lag of 90 degrees with respect to the voltage of the alternating current bus in the αβ coordinates by using the second-order generalized integrator; transforming the orthogonal components in the αβ coordinates into the direct current components in the dq coordinates by PARK transformation, and calculating the d-axis direct current voltage component $U_d$ and the q-axis direct current voltage component $U_q$ in the dq coordinates; and when q-axis direct current voltage component $U_q$ output by one of the single-phase inverters is equal to zero, an output phase of the one of the single-phase inverters is identical to the phase of the alternating current bus, and controlling, by the PI controller, the target value of the output q-axis direct current voltage component $U_q$ to be zero to form closed-loop regulation so as to make the plurality of the single-phase inverters outputting in parallel have the same phase.

5. The parallel control method for single-phase inverters according to claim 1, wherein the droop coefficients in the droop control is corrected in a process that the plurality of the single-phase inverters are started in parallel, and corrected droop correspondences are shown in formulas (6):

$$\begin{cases} f = f_0 - K_f * k_P * P \\ V = V_0 - K_V * k_Q * Q \end{cases} \quad (6)$$

in the formulas (6), $K_f$ represents a frequency correction coefficient, and $K_v$ represents an amplitude correction coefficient.

6. The parallel control method for single-phase inverters according to claim 1, wherein the closed-loop control on the d-axis direct current components and the q-axis direct current components in the dq coordinates are respectively performed in a way of voltage and current double-loop control to obtain the first command value of the output voltages in the axes dq; specific steps are: calculating a difference of the reference command value $U_{dref}$ of the d-axis voltage loop and a voltage output value $U_d$, then, enabling the different to enter a PI controller of the d-axis voltage loop, taking an output of the PI controller of the d-axis voltage loop as a reference command value $I_{dref}$ of a d-axis current loop, calculating a difference of the reference command value $I_{dref}$ of the d-axis current loop and an actual current output value $I_d$, and then, enabling the different to enter a PI controller of the d-axis current loop; calculating a difference of the reference command value $U_{qref}$ of the q-axis voltage loop and a voltage output value $U_q$, then, enabling the different to enter a PI controller of the q-axis voltage loop, taking an output of the PI controller of the q-axis voltage loop as a reference command value $I_{qref}$ of a q-axis current loop, calculating a difference of the reference command value $I_{qref}$ of the q-axis current loop and an actual current output value $I_q$, and then, enabling the different to enter a PI controller of the q-axis current loop; and performing cross decoupling on an output value of the d-axis current loop and an output value of the q-axis current loop to obtain the first command value of the output voltages in the axes dq.

7. The parallel control method for single-phase inverters according to claim 1, wherein the first command value of the output voltages in the dq coordinates is transformed into the second command value of the output voltages in the αβ coordinates by IPARK transformation, and the second command value of the output voltages in the αβ coordinates is transformed into the third command value of the output voltages in the abc coordinates by ICLARKE transformation.

8. The parallel control method for single-phase inverters according to claim 7, wherein the control signal SPWM pulses for regulating the output voltages of each of the single-phase inverters are generated according to the third command value of the output voltages in the abc coordinates; specific steps are: constructing two sinusoidal modulation waves $U_a$ and $U_b$ having same amplitudes and opposite phases according to the third command value of the output voltages in the abc coordinates, wherein the two sinusoidal modulation waves share a triangular wave $U_c$ as a carrier wave; respectively comparing the sinusoidal modulation waves $U_a$ and $U_b$ with the triangular wave $U_c$ to obtain two SPWM waves $U_{g1}$ and $U_{g3}$, wherein the SPWM wave $U_{g1}$ is used as a driving signal of a switching tube Q1 of each of the single-phase inverters, a reverse signal $U_{g2}$ corresponding to $U_{g1}$ is used as a driving signal of a switching tube Q2 of each of the single-phase inverters, the SPWM wave $U_{g3}$ is used as a driving signal of a switching tube Q3 of each of the single-phase inverters, and a reverse signal $U_{g4}$ corresponding to $U_{g3}$ is used as a driving signal of a switching tube Q4 of each of the single-phase inverters; sampling the sinusoidal modulation waves on a peak or trough position of the carrier wave; and generating four control signal SPWM pulses for regulating the output voltages of each of the single-phase inverters by virtue of a comparison module of a digital signal processor.

9. A parallel control system for single-phase inverters, comprising:
  a device configured to acquire output voltages and output currents of each of the single-phase inverters;
  a device configured to reconstruct the output voltages and the output currents, virtualize orthogonal virtual quantities each with a phase difference of 90 degrees from a phase of each of the output voltages or the output currents, respectively, and simulate orthogonal components of a single-phase inverters parallel system in αβ coordinates;
  a device configured to transform the orthogonal components in the αβ coordinates into direct current components in dq coordinates;
  a device configured to calculate instantaneous active power P and instantaneous reactive power Q according to calculation formulas of the instantaneous active power P and the instantaneous reactive power Q; wherein the calculation formulas of the instantaneous active power P and the instantaneous reactive power Q are that:

$$P = \frac{1}{2\sin^2 x}(U_{k-1}I_{k-1} + U_k I_k) - \frac{\cos x}{2\sin^2 x}(U_{k-1}I_k + U_k I_{k-1}) \quad (4)$$

$$Q = \frac{1}{2\sin x}(U_{k-1}I_k - U_k I_{k-1})$$

in the calculation formulas (4), $U_k$ represents a sampling value of a first output voltage at a current moment, $I_k$ represents a sampling value of a first output current at the current moment, $U_{k-1}$ represents a sampling value of a second output voltage at a previous moment, $I_{k-1}$ represents a sampling value of a second output current at the previous moment, and x=2π/N wherein N represents a ratio of a power frequency period to a sampling period;
  a device configured to detect a phase of an alternating current bus, and control a target value of an output q-axis direct current component in the dq coordinates to be zero to make the plurality of the single-phase inverters outputting in parallel have the same phase;
  a device configured to control an output frequency of each of the single-phase inverters by droop control to make output phases of the plurality of the single-phase inverters same so as to equally divide active powers, and control an output amplitude of each of the single-phase inverters by the droop control to make amplitudes of the output voltages of the plurality of the single-phase inverters identical so as to equally divide reactive powers;
  a device configured to make a reference command value $U_{dref}$ of a d-axis voltage loop equal to the an amplitude V of each of the output voltages and a reference command value $U_{qref}$ of a q-axis voltage loop equal to 0, and respectively perform closed-loop control on d-axis direct current components and q-axis direct current components in the dq coordinates to obtain a first command value of the output voltages in axes dq;
  a device configured to calculate a phase of each of the single-phase inverters according to the output frequency of each of the single-phase inverters, transform the first command value of the output voltages in the dq coordinates into a second command value of the output voltages in the αβ coordinates, and transform the second command value of the output voltages in the αβ coordinates into a third command value of the output voltages in abc coordinates; and
  a control unit configured to modulate and generate control signal SPWM pulses for regulating the output voltages of each of the single-phase inverters according to the third command value of the output voltages in the abc coordinates.

10. The parallel control system for single-phase inverters according to claim 9, wherein the output voltages and the output currents of each of the single-phase inverters comprise the first output voltage and the first output current at the current moment as well as the second output voltage and the second output current at the previous moment.

11. The parallel control system for single-phase inverters according to claim 9, wherein further comprises a device configured to correct droop coefficients of the output frequency and the output amplitude during parallel starting.

12. An inverter, comprising a plurality of single-phase inverters connected in parallel, and the plurality of the single-phase inverters have same structure; wherein, the inverter further comprises the parallel control system for single-phase inverters according to claim 9, and both a boost chopper circuit and an inverter circuit of each of the single-phase inverters are connected with the control unit of the parallel control system for single-phase inverters.

* * * * *